(12) United States Patent
Nomura et al.

(10) Patent No.: US 10,416,884 B2
(45) Date of Patent: Sep. 17, 2019

(54) ELECTRONIC DEVICE, METHOD, AND PROGRAM PRODUCT FOR SOFTWARE KEYBOARD ADAPTATION

(71) Applicant: LENOVO (Singapore) PTE. LTD., New Tech Park (SG)

(72) Inventors: Ryohta Nomura, Yamato (JP); Jun Luo, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 241 days.

(21) Appl. No.: 15/383,945

(22) Filed: Dec. 19, 2016

(65) Prior Publication Data

US 2017/0177215 A1 Jun. 22, 2017

(30) Foreign Application Priority Data

Dec. 18, 2015 (JP) ................. 2015-247491

(51) Int. Cl.
 *G06F 3/00* (2006.01)
 *G06F 3/0488* (2013.01)
 *G06F 3/023* (2006.01)

(52) U.S. Cl.
 CPC ........ *G06F 3/04886* (2013.01); *G06F 3/0233* (2013.01); *G06F 3/0488* (2013.01)

(58) Field of Classification Search
 CPC ... G06F 3/04886; G06F 3/0233; G06F 3/0488
 See application file for complete search history.

(56) References Cited

U.S. PATENT DOCUMENTS

| | | | | |
|---|---|---|---|---|
| 8,599,152 B1* | 12/2013 | Wurtenberger | ..... | G06F 3/04895 345/168 |
| 8,826,178 B1* | 9/2014 | Zhang | .................. | G06F 1/1694 715/810 |
| 2006/0100848 A1* | 5/2006 | Cozzi | .................. | G06F 17/2223 704/5 |
| 2009/0009482 A1* | 1/2009 | McDermid | ........... | G06F 1/1613 345/173 |

(Continued)

FOREIGN PATENT DOCUMENTS

| | | |
|---|---|---|
| JP | 2000066817 A | 3/2000 |
| JP | 2002108564 | 4/2002 |

(Continued)

*Primary Examiner* — Stephen S Hong
*Assistant Examiner* — Marshon L Robinson
(74) *Attorney, Agent, or Firm* — Kunzler Bean & Adamson

(57) ABSTRACT

An electronic device is disclosed. The electronic device may include a software keyboard that may include keys, each key including a sensing region and a character code. The software keyboard may detect a contact on a sensing region of a key and output the character code of the key. The electronic device may include a memory that may store a fixed layout and a moving layout. The fixed layout may include one or more fixed sensing regions, and each one may correspond to a key and include an unchangeable range. The moving layout may include one or more moving sensing regions, and each one may correspond to a key and include a changeable range. A character code output unit may, in response to contact at a fixed sensing region or moving sensing region, output the character code corresponding to the key of the contacted sensing region.

20 Claims, 12 Drawing Sheets

(56) References Cited

U.S. PATENT DOCUMENTS

| | | | |
|---|---|---|---|
| 2010/0241985 A1* | 9/2010 | Kim | G06F 3/04886 715/773 |
| 2010/0318695 A1* | 12/2010 | Xing | G06F 3/023 710/67 |
| 2011/0083104 A1* | 4/2011 | Minton | G06F 3/04886 715/815 |
| 2011/0201387 A1* | 8/2011 | Paek | G06F 3/0237 455/566 |
| 2012/0036468 A1* | 2/2012 | Colley | G06F 3/0418 715/773 |
| 2012/0313858 A1* | 12/2012 | Park | G06F 3/0238 345/171 |
| 2013/0106700 A1* | 5/2013 | Sugiura | G06F 3/04886 345/168 |
| 2013/0257732 A1* | 10/2013 | Duffield | G06F 3/0236 345/168 |
| 2013/0285930 A1* | 10/2013 | Thorsander | G06F 3/0488 345/173 |
| 2014/0164973 A1* | 6/2014 | Greenzeiger | G06F 3/04886 715/773 |
| 2014/0189569 A1* | 7/2014 | Eleftheriou | G06F 3/0233 715/773 |
| 2014/0192004 A1* | 7/2014 | Andersson | G06F 3/0237 345/173 |
| 2014/0247218 A1* | 9/2014 | Walton | G06F 3/04886 345/168 |
| 2014/0306898 A1* | 10/2014 | Cueto | G06F 3/04883 345/173 |
| 2017/0017393 A1* | 1/2017 | Luo | G06F 3/04886 |

FOREIGN PATENT DOCUMENTS

| | | |
|---|---|---|
| JP | 2005267424 A | 9/2005 |
| JP | 2005284379 | 10/2006 |
| JP | 2009-163356 | 7/2009 |
| JP | 2010079733 A | 4/2010 |
| JP | 2011501312 A | 1/2011 |
| JP | 2011154573 | 8/2011 |
| JP | 2013098826 | 5/2013 |
| JP | 2013117916 A | 6/2013 |
| JP | 2013217703 | 10/2013 |
| JP | 2014007439 A | 1/2014 |
| JP | 2014176019 | 9/2014 |
| JP | 2004341813 A | 12/2014 |
| JP | 2016143291 A | 8/2016 |
| WO | 2009/054642 A2 | 4/2009 |

\* cited by examiner (A)

(B)

ELECTRONIC DEVICE, METHOD, AND PROGRAM PRODUCT FOR SOFTWARE KEYBOARD ADAPTATION

FIELD

The subject matter disclosed herein relates to an electronic device and more specifically to an electronic device, method, and program product for software keyboard adaptation.

BACKGROUND

Portable electronic devices such as smartphones, personal digital assistances (PDAs), electronic book readers, or the like often use touch screens as image display sections and input sections. Such a portable device may use, as a main character input unit, a software keyboard, on screen keyboard (OSK), a screen keyboard, or the like displayed on a touch screen. A software keyboard may be used for enabling character input on a touch screen.

A user who has mastered typing remembers a relative layout of keys on a keyboard as physical feeling of fingers. A hardware keyboard includes buttons (keys) that correspond to character outputs and provide press feeling independently of one another. When a user touches these independent keys of the hardware keyboard during typing, the user can know where a finger being used for typing is placed (e.g., on a key or on a gap between keys) as a sense of touch of the finger.

With a software keyboard or the like, fingers cannot obtain any tactile information on the typing positions during typing. Thus, even a user who remembers a relative layout as a physical feeling cannot finely adjust the typing positions. Consequently, when such a user performs touch typing with a software keyboard or the like having a fixed layout, the typing position often shifts from a set key position, and even a user who has mastered touch typing tends to increase mistakes of typing unintended keys.

SUMMARY

An electronic device is disclosed. In one embodiment, the electronic device may include a software keyboard. The software keyboard may include one or more keys. Each key may include a sensing region and a character code. The software keyboard may detect a contact on a sensing region of a key and output the character code of the key. The electronic device may include a memory. The memory may store a fixed layout and a moving layout. The fixed layout may include one or more fixed sensing regions. Each fixed sensing region may correspond to a key and may include an unchangeable range. The moving layout may include one or more moving sensing regions. Each moving sensing region may correspond to a key and may include a changeable range. The electronic device may include a character code output unit. The character code output unit may, in response to the contact contacting a fixed sensing region or moving sensing region, output the character code corresponding to the key of the contacted sensing region.

In one embodiment, the electronic device may include a layout change unit. The layout change unit may change the moving sensing regions based on, at least in part, a contact position of a user on the key. In one embodiment, the layout change unit may change each of the moving sensing regions corresponding to at least one key within a range. The range may include a range in which the moving sensing region does not overlap a fixed sensing regions for an adjacent other key. In some embodiments, each of the fixed sensing regions may correspond to a range in which the fixed sensing region does not extend across an outer edge of an image representing a corresponding key.

In one embodiment, the electronic device may include a selection unit. The selection unit may select the fixed layout and the moving layout of a first layout for touch typing. The selection unit may select the fixed layout and the moving layout of a second layout for typing while looking at the software keyboard. In one embodiment, the electronic device may include a determination unit. The determination unit may determine whether a user performs touch typing. The selection unit may select the first layout or the second layout based on, at least in part, a determination result of the determination unit. In one embodiment, the fixed sensing regions of the second layout may be larger than the fixed sensing regions of the first layout. In some embodiments, a degree of overlapping between one of the moving sensing regions and one of the fixed sensing regions corresponding to a display key in the second layout may be larger than the degree of the first layout.

A method is disclosed. In one embodiment, the method may include determining a position of a contact on a software keyboard. The software keyboard may include a plurality of keys. Each key may include a sensing region and a character code. The software keyboard may include a fixed layout. The fixed layout may include one or more fixed sensing regions. Each fixed sensing region may correspond to a key and include an unchangeable range. The software keyboard may include a moving layout. The moving layout may include one or more moving sensing regions. Each moving sensing region may correspond to a key and include a changeable range. The method may include determining whether the position of the contact corresponds to the fixed sensing region or the moving sensing region of a key. The method may include, in response to the position of the contact corresponding to the fixed sensing region or the moving sensing region of the key, outputting the character code of the key.

In one embodiment, the method may include, in response to the position of the contact corresponding to the moving sensing region of the key, moving the moving sensing region based on, at least in part, the position of the contact. In one embodiment, moving the moving sensing region may include moving each of the moving sensing regions corresponding to at least one key within a range in which the moving sensing region does not overlap a corresponding fixed sensing region for an adjacent other key.

In some embodiments, the method may include selecting the fixed layout and the moving layout of a first layout for touch typing. The method may include selecting the fixed layout and the moving layout of a second layout for typing while looking at the software keyboard. In certain embodiments, the method may include determining whether a user performs touch typing. In one embodiment, the method may include selecting the first layout or the second layout based on the determination of whether the user performs touch typing. In one embodiment, selecting at least one of the first layout and the second layout may include providing the fixed sensing regions of the second layout that are larger than the fixed sensing regions of the first layout. In some embodiments, selecting the at least one of the first layout and the second layout may include providing a degree of overlapping between one of the moving sensing regions and one of the fixed sensing regions corresponding to a display key of the second layout and wherein the degree is larger than the degree of the first layout.

A program product is disclosed. The program product may include a non-transitory computer readable storage medium. The storage medium may store code executable by a processor. The executable code may include code to perform determining a position of a contact on a software keyboard. The software keyboard may include one or more of keys. Each key may include a sensing region and a character code. The software keyboard may include a fixed layout. The fixed layout may include one or more fixed sensing regions. Each fixed sensing region may correspond to a key and may include an unchangeable range. The software keyboard may include a moving layout. The moving layout may include one or more moving sensing regions. Each moving sensing region may correspond to a key and may include a changeable range. In one embodiment, the executable code may include code to perform determining whether the position of the contact corresponds to the fixed sensing region or the moving sensing region of a key. In one embodiment, the executable code may include code to perform, in response to the position of the contact corresponding to the fixed sensing region or moving sensing region of the key, outputting the character code of the key.

In one embodiment, the executable code may include code to perform, in response to the position of the contact corresponding to the moving sensing region of the key, moving the moving sensing region based on, at least in part, the position of the contact. In some embodiments, the code to perform moving the sensing region may include code to perform moving each of one or more moving sensing regions corresponding to at least one key within a range in which the moving sensing region does not overlap a corresponding one of the plurality of fixed sensing regions for an adjacent other key.

In one embodiment, the executable code may include code to perform selecting the fixed layout and the moving layout of a first layout for touch typing. The executable code may include code to perform selecting the fixed layout and the moving layout of a second layout for typing while looking at the software keyboard. In certain embodiments, the executable code may include code to perform determining whether a user performs touch typing, and selecting the first layout or the second layout based on the determination of whether the user performs touch typing.

In one embodiment, the code to perform selecting the first layout or the second layout may include code to perform providing the fixed sensing regions of the second layout that may be larger than the fixed sensing regions of the first layout, or providing a degree of overlapping between one of the moving sensing regions and one of the fixed sensing regions corresponding to a display key of the second layout. The degree may be larger than the degree of the first layout.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which.

(B) illustrating another embodiment of the settable range of the moving sensing region in accordance with the area of the range of the fixed sensing region.

Figure 6:
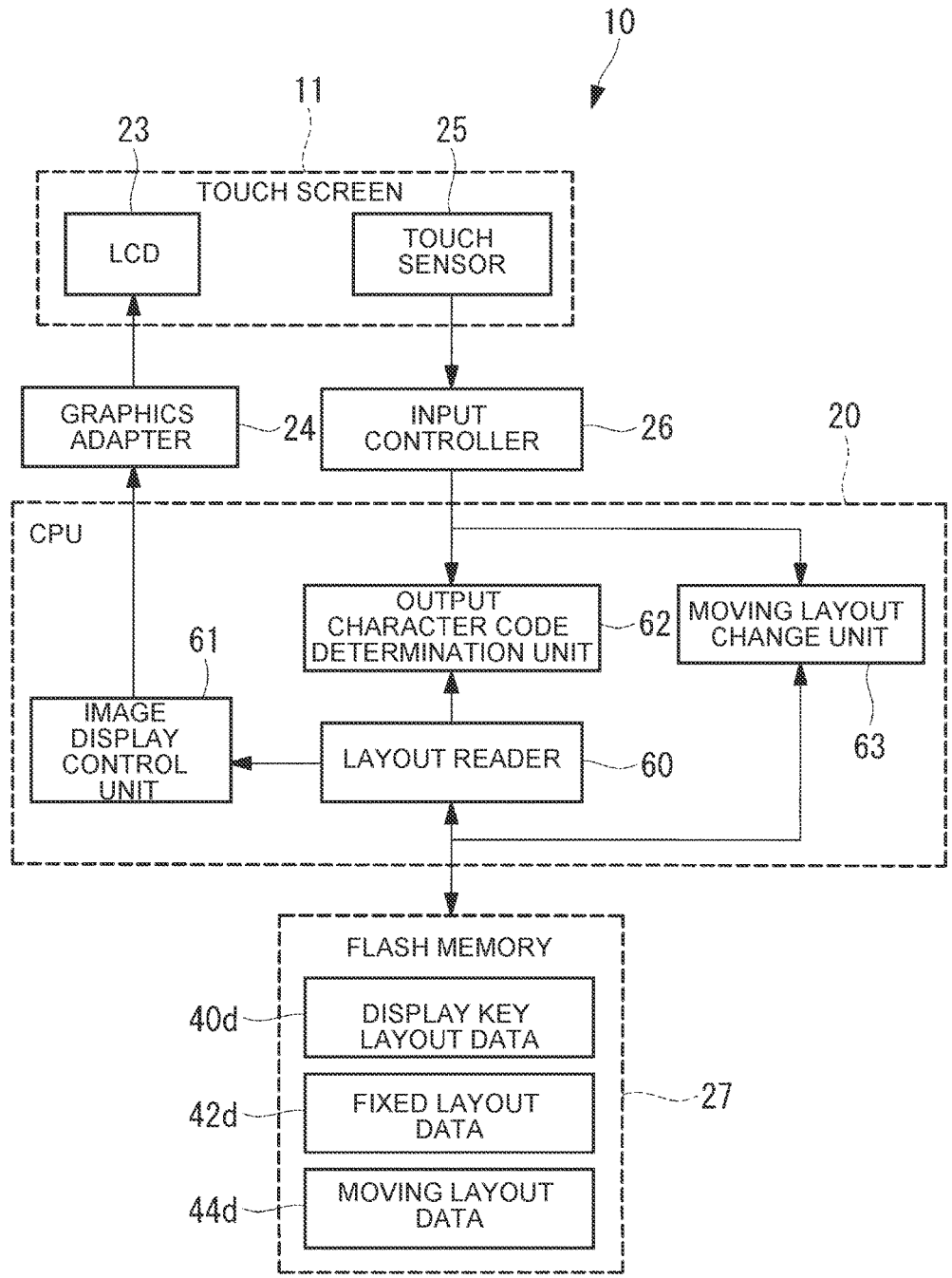
Figure 7:
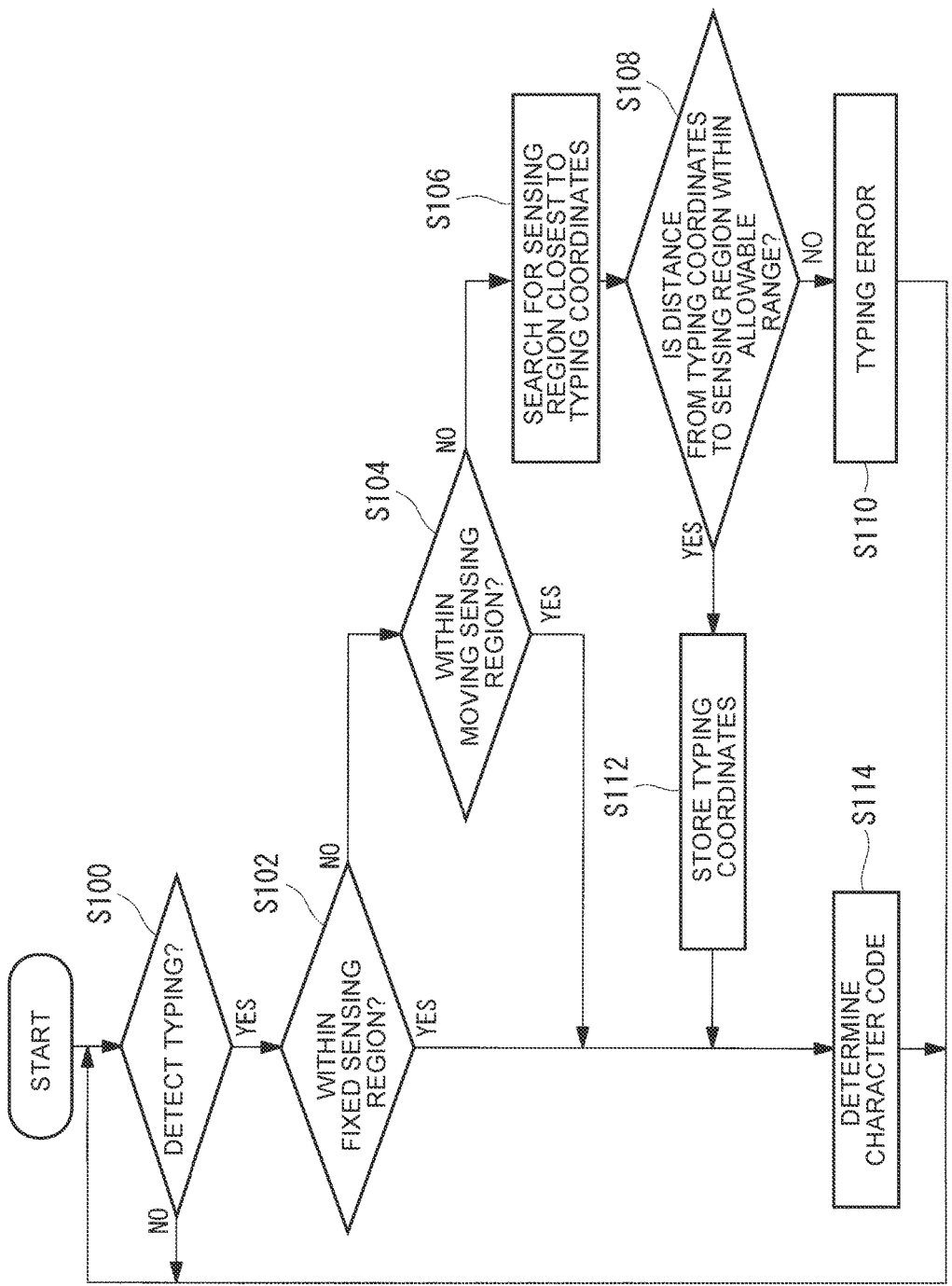
Figure 8:
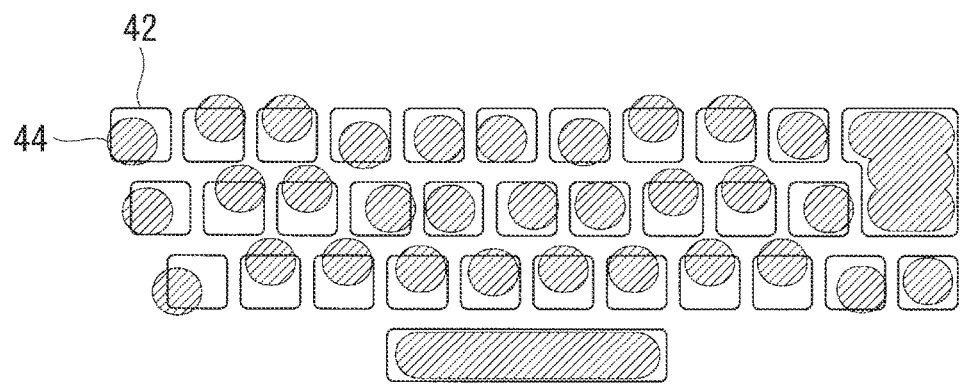
Figure 8:
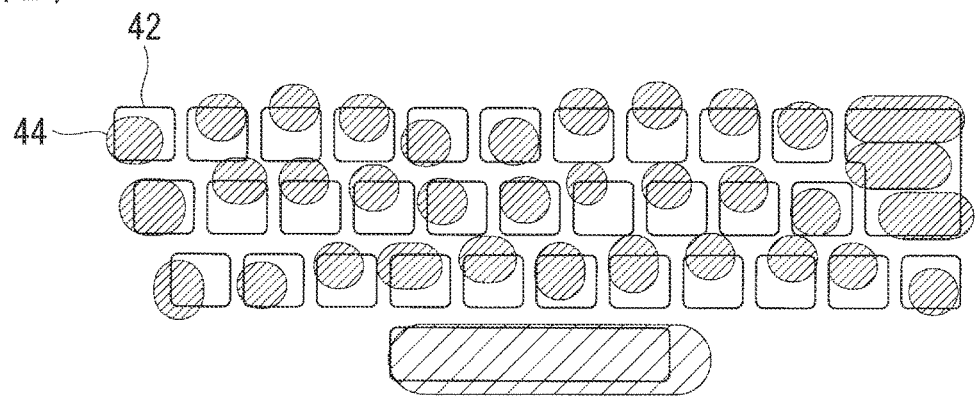

FIG. 6 is a schematic block diagram illustrating one embodiment of a layout control function of a portable electronic device;

FIG. 7 is a flowchart diagram illustrating a method;

FIG. 8 is a schematic block diagram (A) illustrating one embodiment of a dynamic change of a moving layout;

(B) illustrating another embodiment of the dynamic change of the moving layout.

Figure 9:
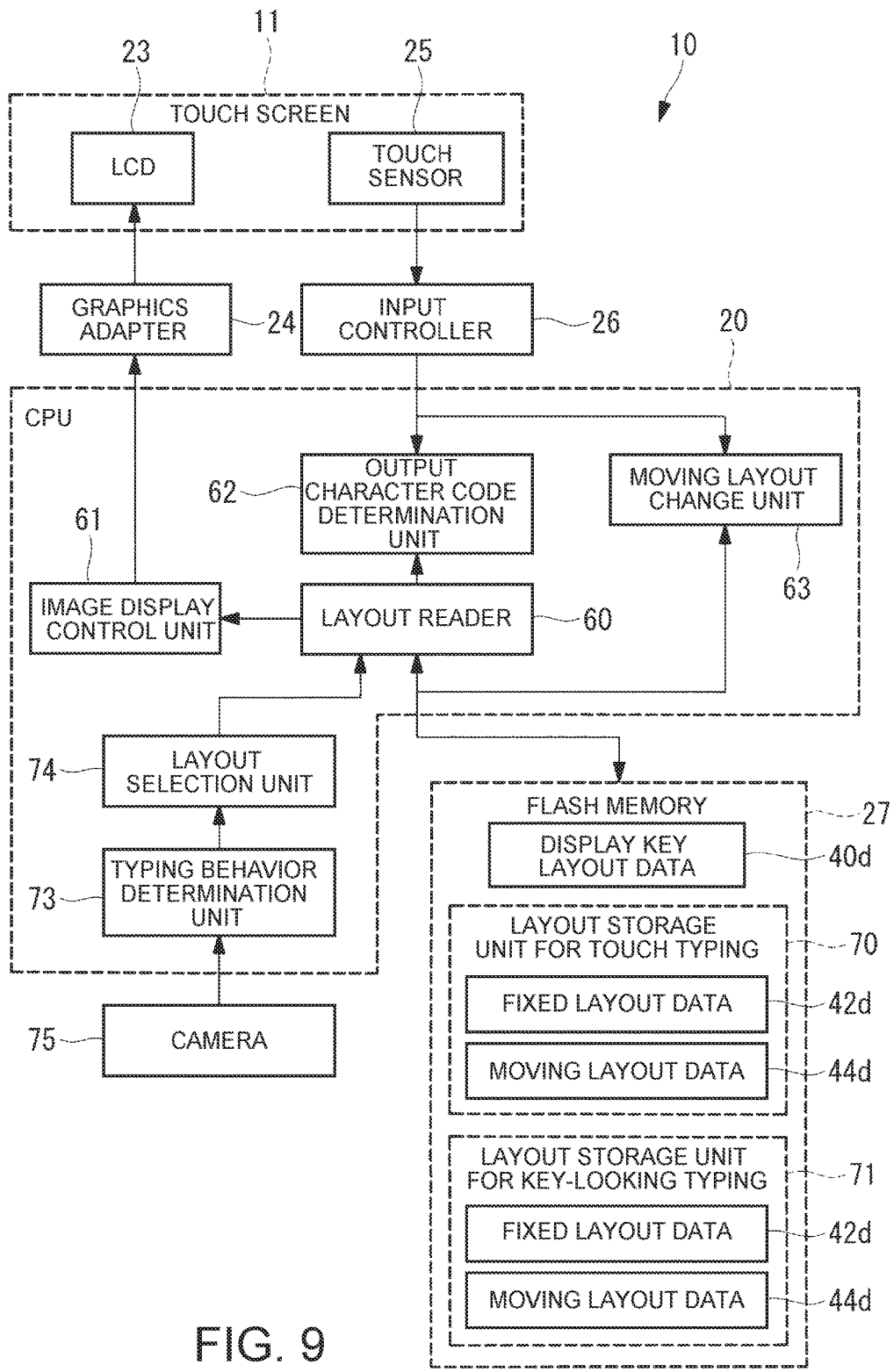
Figure 10A:
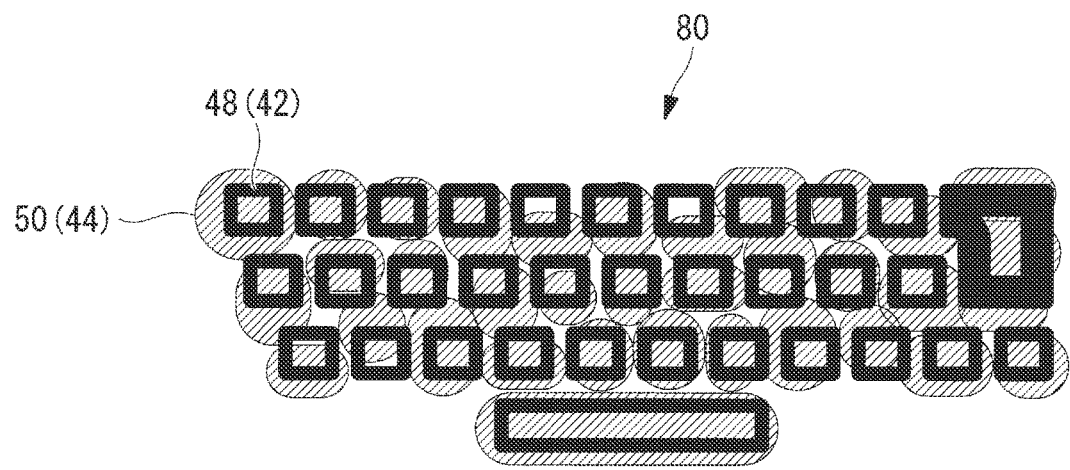
Figure 10B:
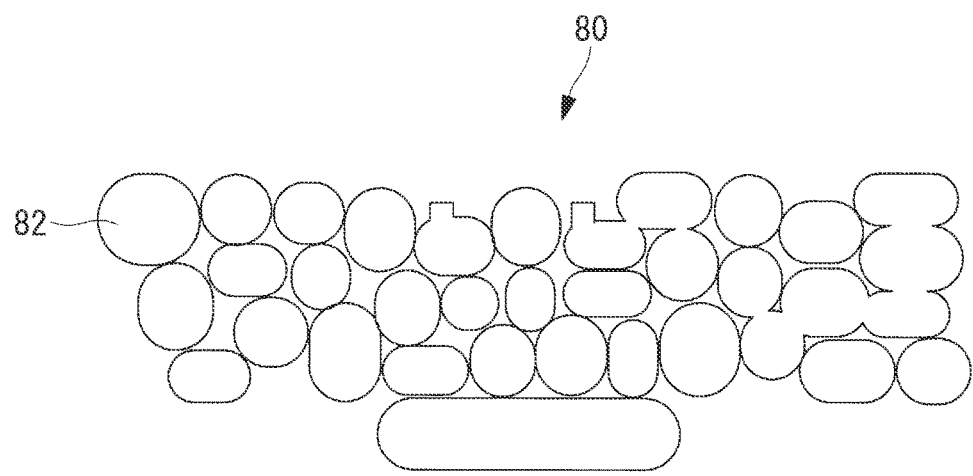
Figure 11A:
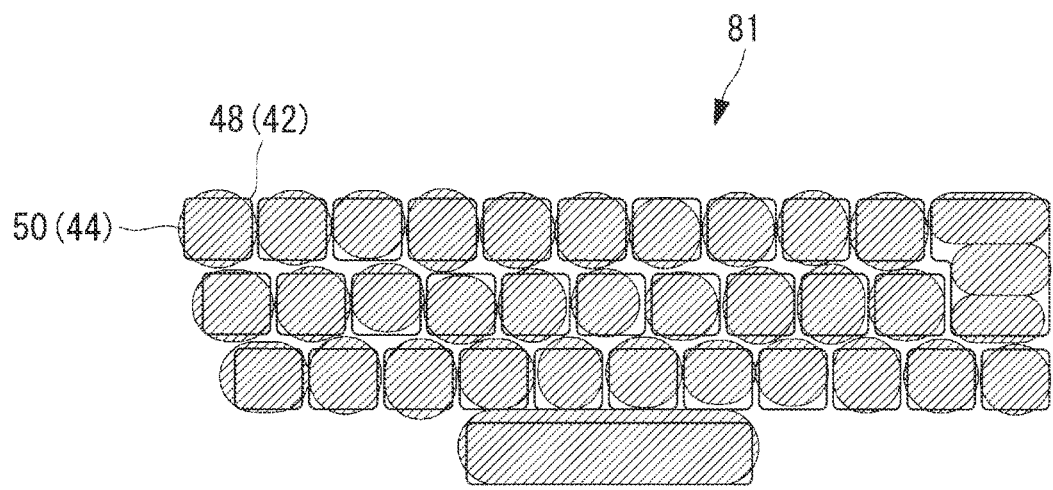
Figure 11B:
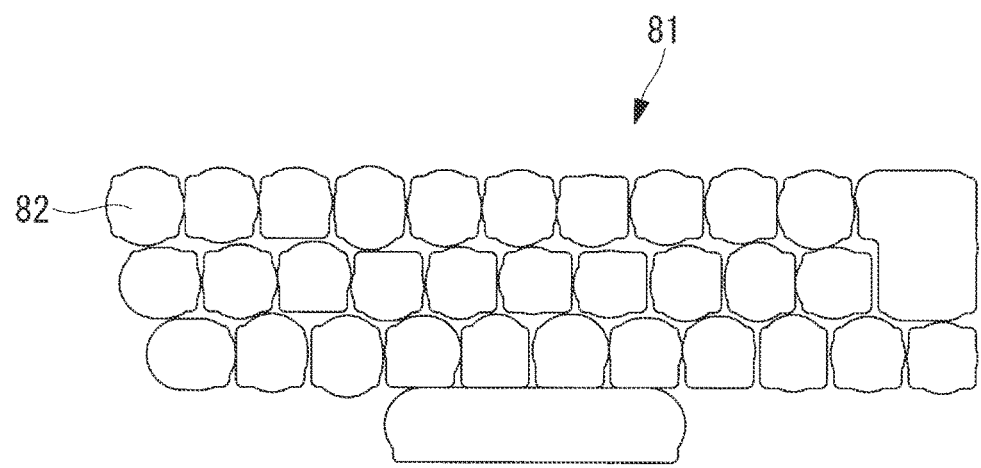
Figure 12:
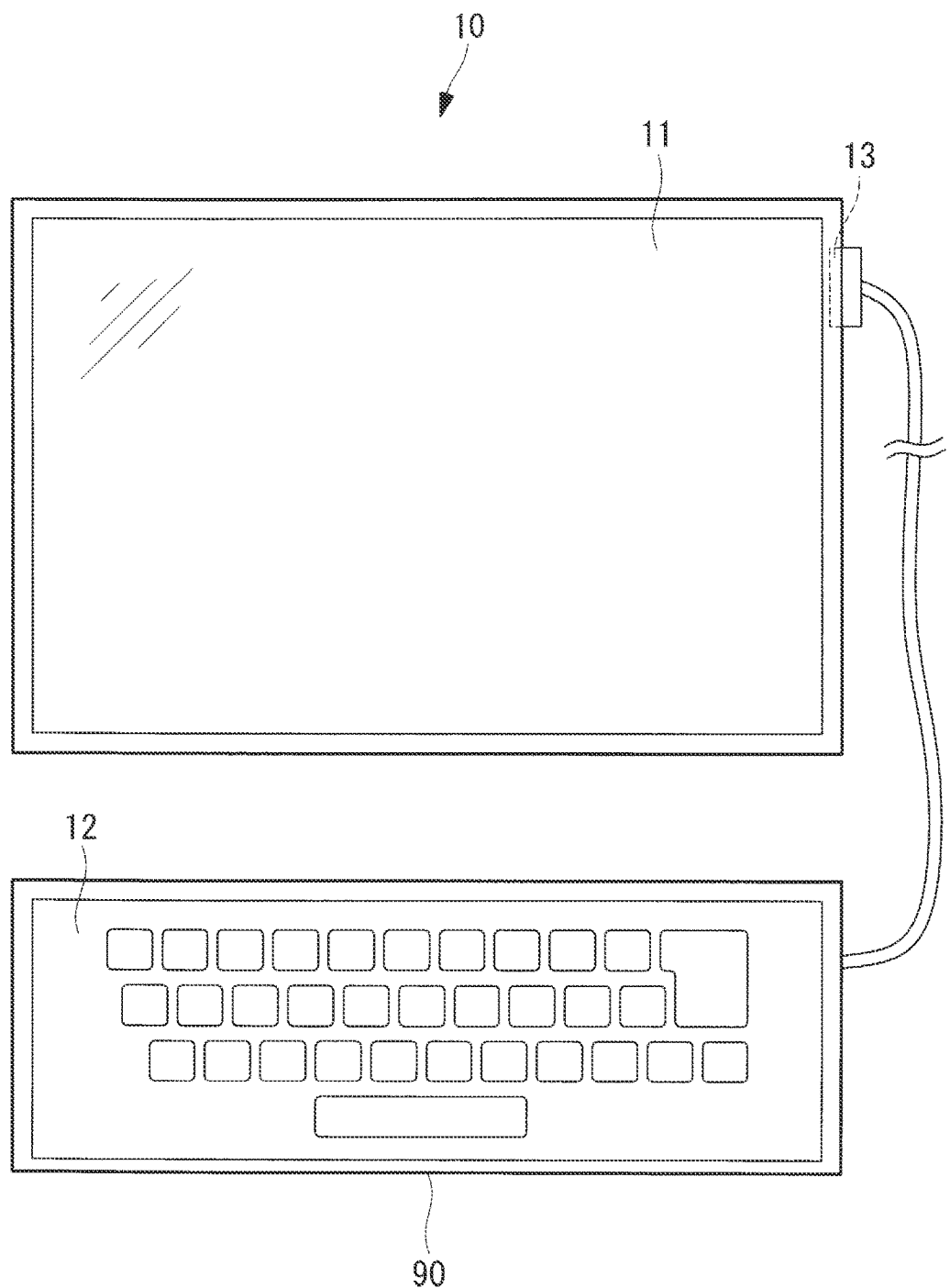

FIG. 9 is a schematic block diagram illustrating one embodiment of a layout control function of a portable electronic device;

FIG. 10A is a schematic view illustrating one embodiment of a layout for touch typing;

FIG. 10B is a schematic view illustrating another embodiment of the layout for touch typing;

FIG. 11A is a schematic view illustrating one embodiment of a layout for key-looking typing;

FIG. 11B is a schematic view illustrating another embodiment of the layout for key-looking typing; and FIG. 12 is a front view illustrating one embodiment of a portable electronic device.

DETAILED DESCRIPTION

Electronic devices, methods, and program products according to embodiments of the present disclosure are described with reference to the drawings.

Figure 1:
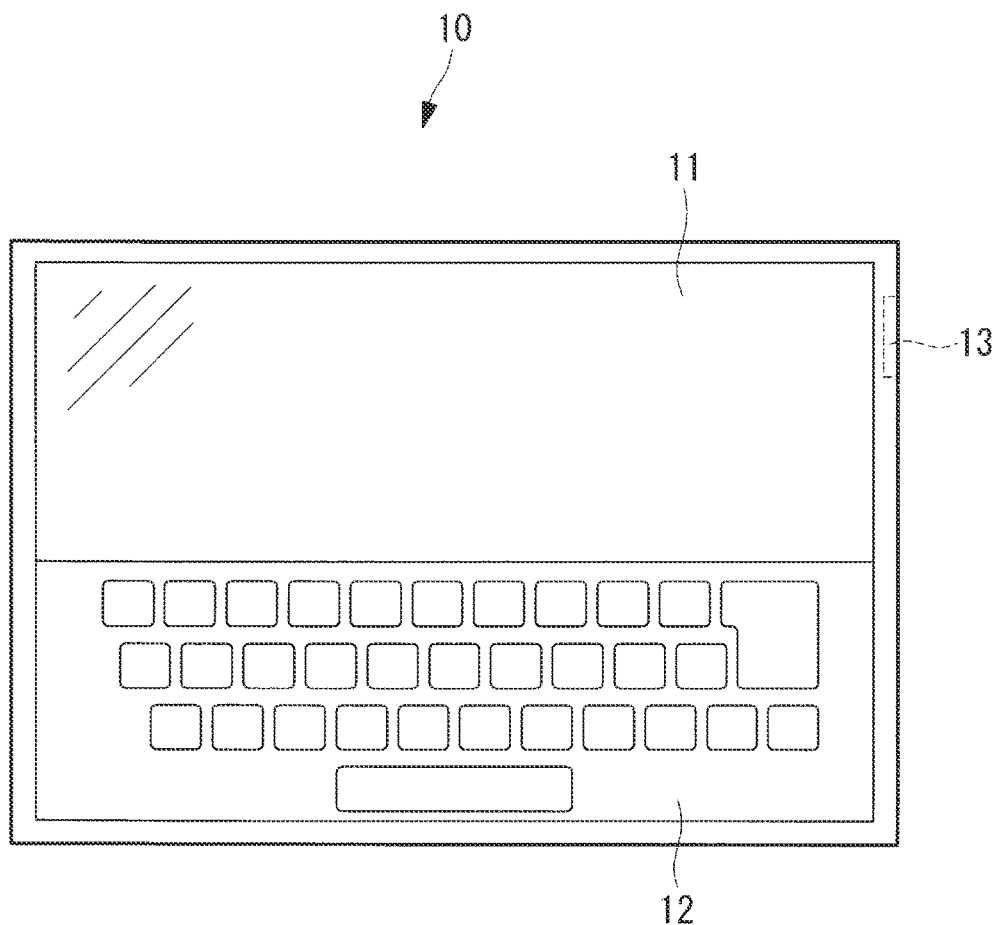
FIG. 1 is a front view illustrating one embodiment of a portable electronic device.

FIG. 1 is a front view illustrating one embodiment of a portable electronic device 10. In one embodiment, the portable electronic device 10 may include a tablet computer having no physical keyboard. In some embodiments, the portable electronic device 10 may include another device such as a smartphone, PDA, smartwatch, laptop, or the like. The portable electronic device 10 may include a device with a touchscreen.

The portable electronic device 10 may include an image display section. The image display section may include a touch screen 11. A user of the portable electronic device 10 may operate the portable electronic device 10 by interacting with the touch screen 11. For example, in response to the user inputting a character, pressing an on-screen button, or the like, the touch screen 11 may display a software keyboard. The user may input one or more characters through the software keyboard. The software keyboard is hereinafter referred to as an on screen keyboard (OSK) 12.

In certain embodiments, the portable electronic device 10 may display an image on a display region different from the touch screen 11. The image display region may include another portable electronic device, a liquid crystal display (LCD), a screen on which an image is projected by a projector, or the like.

In one embodiment, the portable electronic device 10 may include a connection port 13. The connection port 13 may include a universal serial bus (USB) port, a video graphic array (VGA) port, HIGH-DEFINITION MULTIMEDIA INTERFACE (HDMI) port, or the like. The connection port 13 may be used for connecting another device such as a mouse, external storage, or the like.

Figure 2:
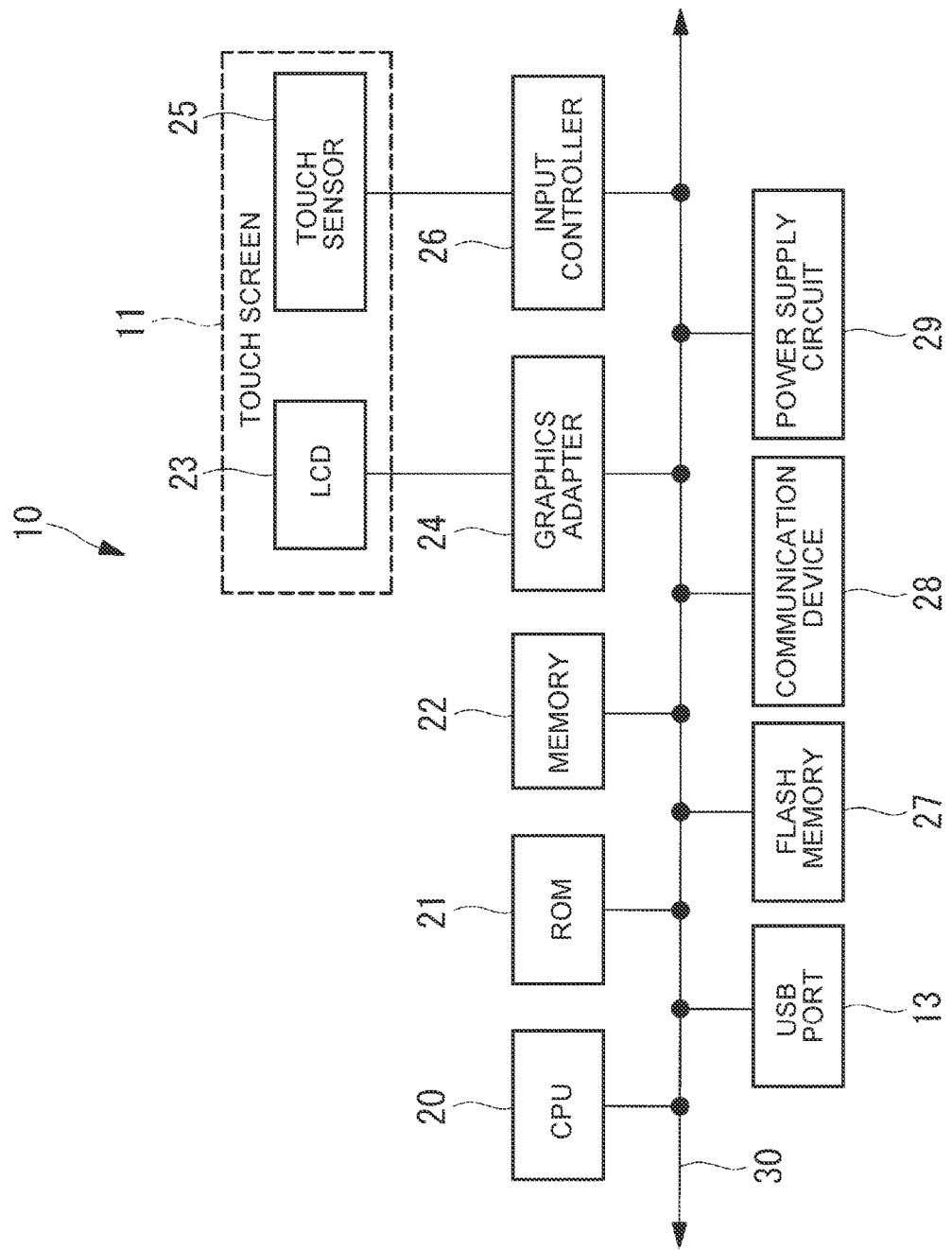
FIG. 2 is a schematic block diagram illustrating one embodiment of a hardware configuration of a portable electronic device.

FIG. 2 is a schematic block diagram that illustrates one embodiment of a hardware configuration of the portable electronic device 10. The portable electronic device 10 may include a central processing unit (CPU) 20, a read only memory (ROM) 21, a memory 22, a liquid crystal display (LCD) 23, a graphics adapter 24, a touch sensor 25, an input controller 26, a flash memory 27, a communication device 28, a power supply circuit 29, and/or the connection port 13. These components may be connected directly or indirectly through a bus 30. The touch screen 11 may include the LCD 23 and the touch sensor 25.

In some embodiments, the CPU 20 may control at least a portion of the portable electronic device 10. The CPU 20 may control the portable electronic device 10 using an operating system (OS) stored in the flash memory 27. The flash memory 27 may connect to the CPU 20 through the bus 30. The CPU 20 may perform processing based on one or more programs stored in the flash memory 27.

In one embodiment, the ROM 21 may store a basic input/output system (BIOS) and various types of data, for example. In certain embodiments, the memory 22 may include a cache memory, a random access memory (RAM), or the like. The memory 22 may include a programmable memory. The portable memory may include a work area for reading a program executed by the CPU 20 or writing of data to be processed by a program.

In one embodiment, the LCD 23 may display a video signal from the graphics adapter 24. The video signal may include an image. The image may include an imaged processed by the CPU 20. Based on, at least in part, the CPU 20, the graphics adapter 24 may convert display information to a video signal. The graphics adapter 24 may output the obtained video signal to the LCD 23.

In certain embodiments, the touch sensor 25 may include a capacitance-type touch sensor. The touch sensor 25 may detect a touch position of a user's input on the LCD 23. The touch sensor 25 may output the detected touch position to the input controller 26. The touch sensor 25 may select a screen object such as a menu, icon, button, or key of a keyboard displayed on the screen of the LCD 23. The touch sensor 25 may perform an input operation such as inputting text, scrolling, swiping, or the like. The LCD 23 and/or the touch sensor 25 may include the touch screen 11.

In one embodiment, the input controller 26 may perform processing by causing a processor, such as the CPU 20, to execute programs stored in the ROM 21, the memory 22, or the like. The input controller 26 may control an operation of the touch sensor 25.

In certain embodiments, the flash memory 27 may store data, programs, or the like. For example, the flash memory 27 may store an OS for controlling the portable electronic device 10. An OS may include WINDOWS, IOS, ANDROID or the like. The flash memory 27 may store drivers for hardware operations of peripheral devices, applications for specific jobs, various types of data, files, or the like. The portable electronic device 10 may include another storage unit, such as a hard disk drive (HDD), instead of the flash memory 27.

The communication device 28 may control communication with other devices through a network. In one embodiment, the communication device 28 may include a network port or card, for example, for Wi-Fi, Ethernet, or the like. In one embodiment, the power supply circuit 29 may include an AC adapter, an intelligent battery, a charger for charging the intelligent battery, a DC-to-DC converter, or the like. The power supply circuit 29 may supply electric power to the devices.

In one embodiment, the OSK 12 may include a keyboard-like electronic device that may use, as an input, a contact of a contact medium. A contact medium may include a finger of a user, a dedicated medium (e.g. a touch pen or stylus). The OSK 12 may include a sensing region set for each character code. The character code may include a code associated with a character or a symbol. The character may be output in response to the touch sensor 25 detecting contact with the sensing region. The touch sensor 25 may include a planar sensor.

Figure 3:
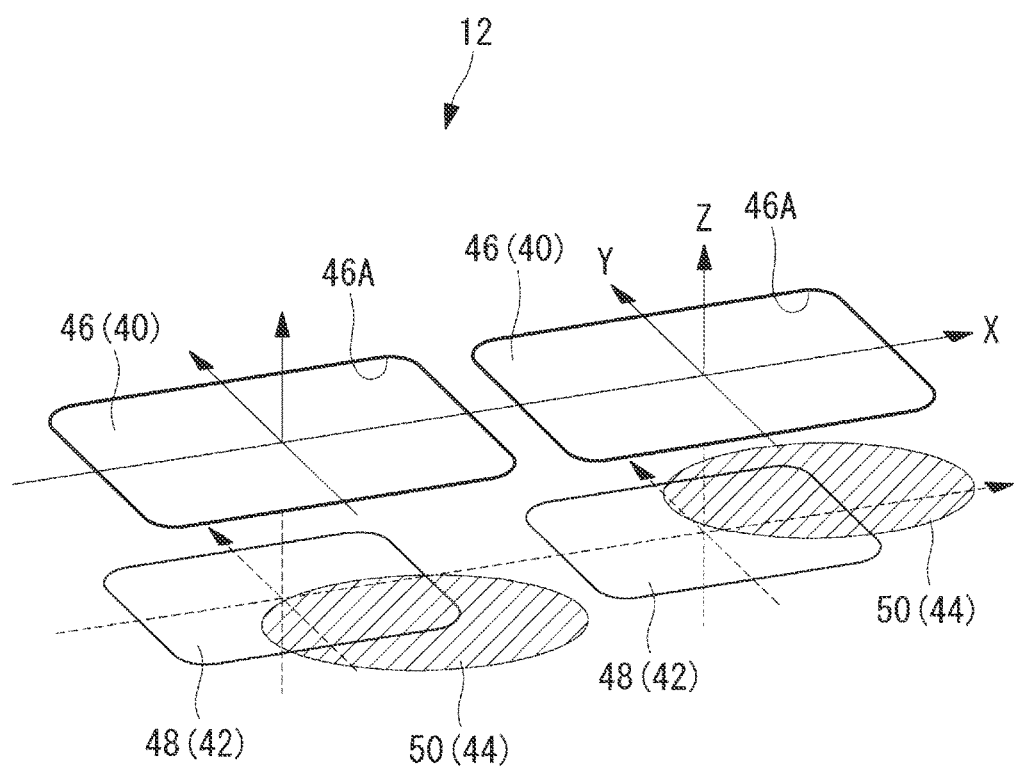
FIG. 3 is a perspective view illustrating one embodiment of an arrangement of layouts of a software keyboard.

FIG. 3 is a schematic perspective diagram illustrating one embodiment of an arrangement of layouts of the OSK 12. An X-axis direction in FIG. 3 may include a lateral direction of the OSK 12, a Y-axis direction may include a longitudinal direction of the OSK 12, and a Z-direction may include a direction perpendicular to a plane of the OSK 12. The OSK 12 may include a display key layout 40, a fixed sensing layout 42, and/or a moving sensing layout 44 in association with one another. Key arrangements of the display key layout 40, the fixed sensing layout 42, and the moving sensing layout 44 may correspond to one another.

In one embodiment, the display key layout 40 may include one or more display key images 46. A display key image 46 may represent characters and/or symbols to be output and displayed on the OSK 12 on the touch screen 11. The display key images 46 may include a layout similarly to that of a general hardware keyboard.

In certain embodiments, the fixed sensing layout 42 and the moving sensing layout 44 may not be displayed as images on the touch screen 11. The fixed sensing layout 42 and moving sensing layout 44 may include virtual layouts that are not visible to a user. In one embodiment, the fixed sensing layout 42 may include a plurality of fixed sensing regions 48. Each fixed sensing region 48 may correspond to a display key. A fixed sensing region 48 may include an unchangeable range. In certain embodiments, the moving sensing layout 44 may include one or more moving sensing regions 50. Each moving sensing region 50 may correspond to a display key and may include a changeable range. The ranges and locations of the fixed sensing regions 48 and the moving sensing regions 50 may be specified by using XY coordinates. In the following description, when the fixed sensing regions 48 and the moving sensing regions 50 are not distinguished from each other, these regions are collectively referred to as sensing regions.

As described herein, a range may include the possible area that a sensing region, such as the fixed sensing region 48 or the moving sensing region 50, may include. For example, a fixed sensing region 48 may include an unchangeable range. This may mean that the area on the OSK 12 and the position of that area that corresponds to the key of that fixed sensing area 48 may not change. A moving sensing region 50 may include a changeable range. This may mean that the area on the OSK 12 and the position of that area that corresponds to the key of the moving sensing area 50 may change. A change in a range may include a change in a position of that area and/or a change in the shape, size, or the like of that area. Further details about a range or ranges are described below.

Each of the fixed sensing regions 48 may include a range in which the fixed sensing region 48 does not overlap its adjacent display key. Each of the fixed sensing regions 48 may include a range in which the fixed sensing region 48 does not extend across an outer edge 46A of the corresponding display key image 46. For example, each of the fixed sensing regions 48 and its corresponding display key image 46 may include their centers substantially coinciding with each other. Each of the moving sensing regions 50 may include a range across the outer edge 46A of its corresponding display key image 46. The moving sensing regions 50 may dynamically change based on a contact position (also referred to as a typing position) of, for example, a finger of a user. The change of the moving sensing regions 50 may refer to a change (e.g. in range) of the moving sensing regions 50 and movement of the moving sensing regions 50 without a change in shape of the moving sensing regions 50.

In one embodiment, two sensing regions of the fixed sensing region 48 and the moving sensing region 50 may be set for each output character code. In response to the touch sensor 25 detecting contact with one of the fixed sensing region 48 and the moving sensing region 50, a character code corresponding to the contact position may be output.

Figure 4:
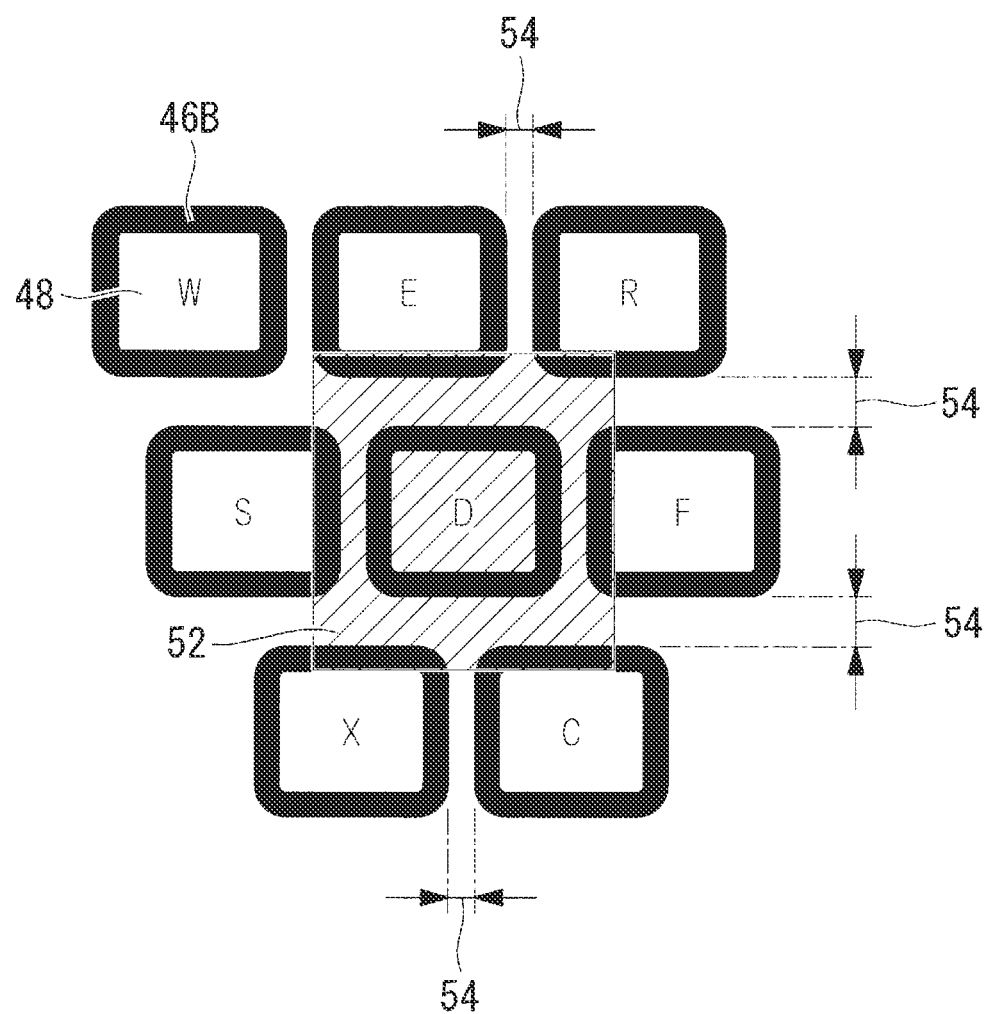
FIG. 4 is a top-down schematic view illustrating one embodiment of a range of a fixed sensing region and a settable range of a moving sensing region.

FIG. 4 is a schematic diagram illustrating one embodiment of ranges of the fixed sensing regions 48 and the settable range 52 of one of the moving sensing regions 50. The settable range 52 of the moving sensing region 50 may include a range of change of the moving sensing region 50.

As described above, each of the fixed sensing regions 48 may include a range in which the fixed sensing region 48 does not overlap its adjacent display key. In FIG. 4, the fixed sensing region 48 may include a region located inside the display key image 46 and not filled with black. The set range of the fixed sensing region 48 may be maintained and may not dynamically change. However, the moving sensing regions 50 may dynamically change. In the following description, regions filled with black in FIG. 4 are referred to as non-fixed sensing regions 46B.

In certain embodiments, each moving sensing region of the moving sensing regions 50 does not extend across the fixed sensing regions 48 corresponding to adjacent other character codes. In other words, the moving sensing region 50 may overlap the fixed sensing region 48 for a character code corresponding to the moving sensing region 50, but may not overlap the fixed sensing regions 48 for adjacent other character codes. In the example of FIG. 4, a hatched region may include the settable range 52 of the moving sensing region 50. The moving sensing region 50 may be set as long as the moving sensing region 50 is located within the non-fixed sensing region 46B, even if the moving sensing region 50 is located within the ranges of the display key images 46 corresponding to adjacent other display keys. The settable range 52 of the moving sensing region 50 may include the display key image 46 corresponding to the moving sensing region 50, gaps 54 between the moving sensing region 50 and its adjacent display key images 46, and/or the non-fixed sensing regions 46B adjacent to the moving sensing region 50. The moving sensing region 50 may dynamically change based on, at least in part, adjusting the portable electronic device 10 contact positions of typing detected for each user.

Figure 5:
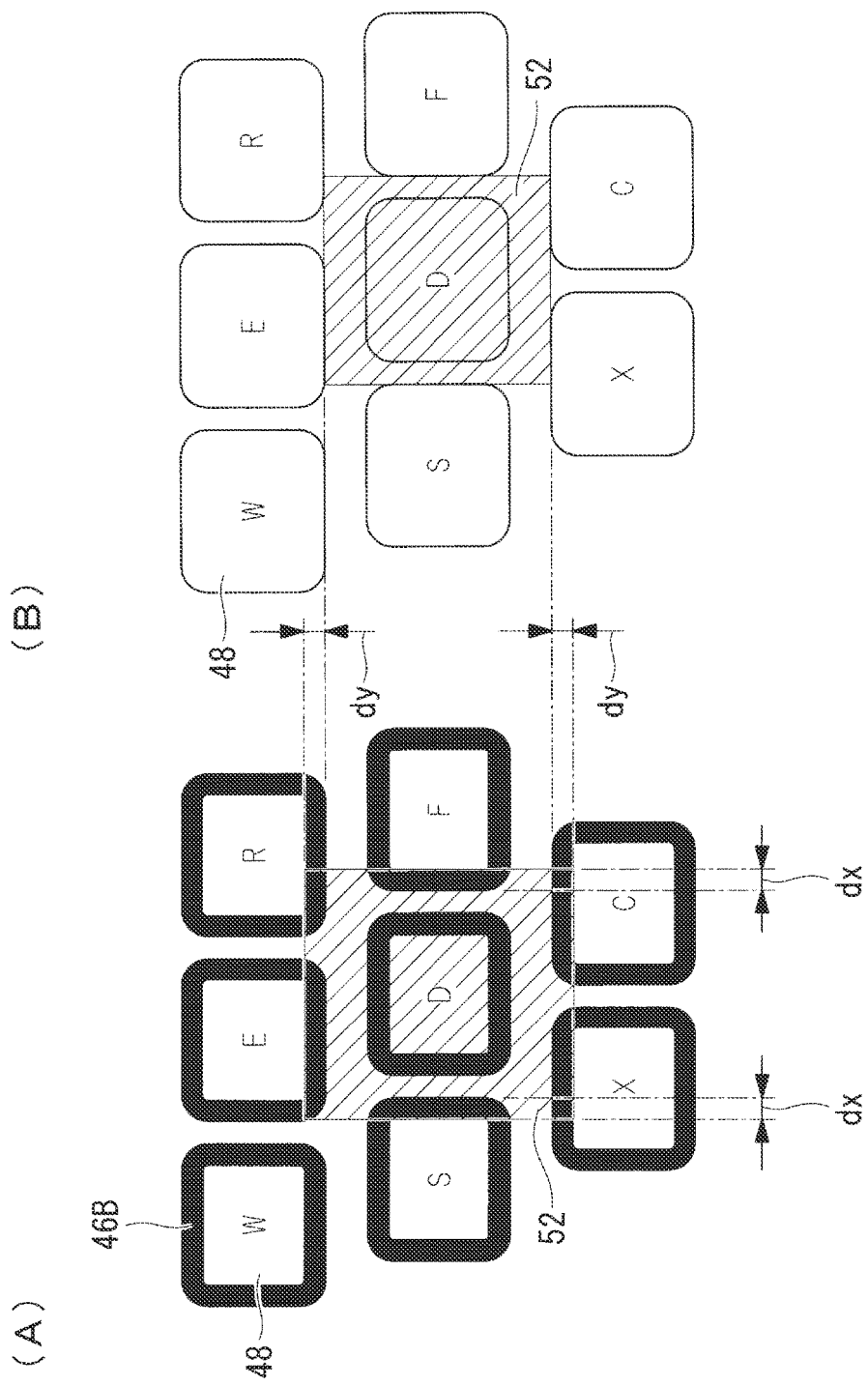
FIG. 5 is a top-down schematic view (A) illustrating one embodiment of a settable range of a moving sensing region in accordance with an area of a range of a fixed sensing region.

FIGS. 5(A) and (B) is a schematic diagram illustrating one embodiment of the settable range 52 of one of the moving sensing regions 50 of areas of the ranges of the fixed sensing regions 48. FIG. 5(A) depicts one embodiment where each fixed sensing region 48 may include the corresponding display key image 46. The non-fixed sensing region 46B in FIG. 5(A) may include a difference between the fixed sensing region 48 and the outer edge 46A of the display key image 46 (dx×2, dy×2). FIG. 5(B) depicts one embodiment where each fixed sensing region 48 may include the same range as the corresponding display key image 46. In other words, as depicted in FIG. 5(B), the outer edge of the fixed sensing region 48 may coincide with the outer edge 46A of the display key image 46 In one embodiment, the non-fixed sensing region 46B is not provided.

In certain embodiments, the fixed sensing regions 48 illustrated in FIG. 5(B) may include an area larger than that of the fixed sensing regions 48 illustrated in FIG. 5(A). In one embodiment, since the non-fixed sensing region 46B may not be provided, the settable range 52 of the moving sensing region 50 illustrated in FIG. 5(B) may be smaller than the settable range 52 of the moving sensing region 50 illustrated in FIG. 5(A).

As illustrated in FIGS. 5(A) and 5(B), in some embodiments, in response to the fixed sensing region 48 becoming smaller, the change area of the moving sensing region 50 may increase. The moving sensing region 50 associated with a user may be more easily set. In one embodiment, a user who performs touch typing may type positions based on a memory of physical feeling without looking at the OSK 12. The user may often type positions shifted away from the display key images 46, which may cause the user to contact or type incorrect keys. If the fixed sensing regions 48 include smaller areas, the change range of the moving sensing regions 50 may be enlarged. Irrespective of the positions of the display keys, the sensing regions based on the memory of physical feeling of the user may be set in wider areas.

In some embodiments, a user may not perform touch typing but may type while looking at the OSK 12. This user may not often type at positions shifted from the display key images 46 during typing. If the fixed sensing regions 48 are set to have wider areas, the OSK 12 may assist the user who types while looking at the OSK 12 to type more accurately. In some embodiments, the OSK 12 may include a keyboard usable for both of a user who performs touch typing and a user who types while looking at the OSK 12 in accordance with the areas of the fixed sensing regions 48. The areas of the ranges of the fixed sensing regions 48 may be set for each user.

The portable electronic device 10 may detect a contact with sensing regions of the fixed sensing layout 42 and the moving sensing layout 44 to output a character code corresponding to a contact position. The portable electronic device 10 may change the moving layout in response to the contact position (hereinafter referred to as a "layout control function").

FIG. 6 is a schematic block diagram illustrating one embodiment of a layout control function of the portable electronic device 10. The CPU 20 may include a layout reader 60, an image display control unit 61, an output character code determination unit 62, and/or a moving layout change unit 63.

In one embodiment, the flash memory 27 may store display key layout data 40d. The display key layout data 40d may represent the display key layout 40. Fixed layout data 42d may represent the fixed sensing layout 42. Moving layout data 44d may represent the moving sensing layout 44. The fixed layout data 42d may represent the fixed sensing region 48 corresponding to each character code in XY coordinates. The moving layout data 44d may represent the moving sensing region 50 corresponding to each character code in XY coordinates.

In certain embodiments, the layout reader 60 may read the display key layout data 40d, the fixed layout data 42d, and/or the moving layout data 44d from the flash memory 27. The layout reader 60 may output the display key layout data 40*d* to the image display control unit 61 and output the fixed layout data 42*d* and the moving layout data 44*d* to the output character code determination unit 62. In one embodiment, the image display control unit 61 may output the display key layout data 40*d* from the layout reader 60 to the graphics adapter 24 and may cause the LCD 23 to display the display key layout 40.

In certain embodiments, the output character code determination unit 62 may receive, for example, through the input controller 26, a contact position of a finger on the touch screen 11 detected by the touch sensor 25. The output character code determination unit 62 may determine a contact position of a finger for the fixed layout data 42*d* and the moving layout data 44*d* input from the layout reader 60. The output character determination unit 62 may determine a character code corresponding to the sensing region contacted by the user (hereinafter referred to as "character code determination") and output the determined character code (hereinafter referred to as a "character code output process"). The determination of a character code may include determination of a character code to be output based on the position contacted by the user on the OSK 12. In some embodiments, the moving layout change unit 63 may change the moving sensing region 50. The moving sensing region 50 may include the moving sensing layout 44 based on, at least in part, the contact position on the touch screen 11.

FIG. 7 is a schematic flowchart depicting a method. The method may be performed by the output character code determination unit 62 and the moving layout change unit. A program implementing the method on the portable electronic device 10 may be stored in a predetermined region of the flash memory 27.

In one embodiment, the method may include step 100. In step 100, is the method may determine whether typing output from the input controller 26 is detected. If typing output is detected, the method may proceed to step 102. The case where typing is detected may include a case where a contact is detected within the range of the display key layout 40 displayed on the touch screen 11. A contact position by typing may be determined in XY coordinates. In the following description, the contact position by typing is referred to as typing coordinates. Typing with a finger often contacts the touch screen 11 on the surface. In one embodiment of the method, in a case where a finger contacts the touch screen 11 on the surface, a center point on the contact surface may be used as typing coordinates.

In one embodiment, the method may include step 102. In step 102, is the method may determine whether the typing coordinates are within the fixed sensing region 48. If the typing coordinates are within the fixed sensing region, the method may proceed to step 114. Otherwise, the method may proceed to step 104.

In one embodiment, the method may include step 104. In step 104, the method may determine whether the typing coordinates are within the moving sensing region 50. If the typing coordinates are within the moving sensing region 50, the method may proceed to step 114. Otherwise, the method may proceed to step 106.

In some embodiments, the method may include step 106. In step 106, the method may search for a sensing region closest to the typing coordinates. In one embodiment, a linear distance between the typing coordinates and an outer edge of a sensing region is calculated. A sensing region having the shortest linear distance may be selected as the closest sensing region.

In certain embodiments, the method may include step 108. In step 108, is the method may determine whether the shortest distance from the typing coordinates to the sensing region calculated in step 106 is within a predetermined allowable range. If the determined shortest distance is within the predetermined allowable range, the method may proceed to step 112. Otherwise, the method may proceed to step 110.

In one embodiment, the method may include step 110. In step 110, is the method may determine the typing to be a contact with the OSK 12 not intended to a key input (e.g. a typing error). The method may return to step 100 without performing the character code output process.

In some embodiments, the method may include step 112. In step 112, the method may include storing typing coordinates in the flash memory 27 as a typing history. The stored typing coordinates may be determined to be the moving sensing region 50 for a character code corresponding to the closest sensing region. Through this process in step 112, a habit, for example, of typing of a user may be learned, and the moving sensing regions 50 may dynamically change.

In one embodiment, the method may include step 114. In step 114, the method may include character code determination. In response to the method proceeding from step 102 to step 114, the character code determination corresponding to the fixed sensing region 48 including the detected typing coordinates may be performed. In response to the method proceeding from step 104 to step 114, the character code determination corresponding to the moving sensing region 50 including the detected typing coordinates may be performed.

In some embodiments, in response to the method proceeding from step 112 to step 114, the character code determination corresponding to the sensing region closest to the detected typing coordinates may be performed in step 114. In one embodiment, in the typing process, in response to a user typing and contacting a position in the gap 54 between keys and outside of the sensing regions, a process in accordance with a display key corresponding to the closest sensing region may be performed. Thus, substantially no gap 54 may be present between keys.

FIGS. 8(A) and (B) are a schematic diagrams illustrating one embodiment of a dynamic change of the moving sensing layout 44. In other words, FIGS. 8(A) and (B) depict one examples of the moving sensing layout 44 before and after leaning based on a typing history. FIG. 8(A) illustrates one embodiment of an initial layout of the moving sensing layout 44 before adjustment. The initial layout may be preset in the OSK 12. FIG. 8(B) illustrates one embodiment of a layout of the moving sensing layout 44 after the adjustment. The fixed sensing layout 42 may not change between FIG. 8(A) and FIG. 8(B).

In one embodiment, the moving sensing layout 44 after adjustment, as illustrated in FIG. 8(B), may show a larger change in the moving sensing regions 50 set for a space key and an enter key, than the moving sensing layout 44 before adjustment as illustrated in FIG. 8(A). This adjustment may be in response to a habit of a user and may be reflected on a change of the moving sensing layout 44. In response to a user who tends to press a portion near an upper edge of a specific key, the moving sensing regions 50 may adjust and move upward. In response to a user who shows a small variation of the typing position for a specific key, the moving sensing regions 50 may adjust and change to smaller regions. In one embodiment, in response to a user who shows a large variation of the typing position for a specific key, the moving sensing regions 50 may adjust and change to larger regions. In certain embodiments, the moving sensing layout 44 may change for each user. The moving sensing regions 50 may include regions based on a physical feeling and a habit of the user.

As described above, the portable electronic device 10 may include the OSK 12. The OSK 12 may include the fixed sensing layout 42 that may include the fixed sensing regions 48. Each fixed sensing region 48 may include a corresponding character code and an unchangeable range. The moving sensing layout 44 may include the moving sensing regions 50. Each moving sensing region 50 may include a corresponding character code and a changeable range. In response to the user contacting one of the fixed sensing regions 48, one of the moving sensing regions 50, or the gap 54 between the regions 48 and 50, the portable electronic device 10 may output a character code corresponding to the sensing region contacted by the user. In other words, the fixed sensing layout 42 may include the fixed sensing regions 48, each of which may coincide with the position of the corresponding displayed key image 46. The moving sensing layout 44 may include the moving sensing regions 50, each of which may change based on, at least in part, the typing of a user.

The portable electronic device 10 may facilitate an input to the OSK 12 while maintaining inherently high productivity during touch typing on the OSK or the like whose key arrangement dynamically changes.

In one embodiment, the portable electronic device 10 may include a layout selection function. The layout selection function may select different combinations of a fixed sensing layout 42 and a moving sensing layout 44 between a user who performs touch typing and a user who performs key-looking typing. FIG. 9 is a schematic block diagram illustrating one embodiment of the layout selection function. One or more components of the configuration illustrated in FIG. 9 are already described with reference to FIG. 6 and are denoted by the same reference numerals, and description thereof is not repeated here.

In one embodiment, a flash memory 27 may include a layout storage unit 70. The layout storage unit 70 may include or store data for touch typing. The flash memory 27 may include a layout storage unit 71. The layout storage unit 71 may include data for key-looking typing. The layout storage unit 70 and/or 71 may include one or more subdivisions of the flash memory 27, one or more programs or applications stored in the flash memory 27, or the like.

In certain embodiments, the layout storage unit 70 for touch typing may store fixed layout data 42d and moving layout data 44d set in a layout. The layout may place importance on, prioritize, or the like, touch typing and may facilitate touch typing for a user that performs touch typing. The fixed layout data 42d and the moving layout data 44d stored in the layout storage unit 70 for touch typing are collectively referred to as a layout for touch typing (touch typing layout). The layout for touch typing may be stored as a layout that differs among users.

In one embodiment, the layout storage unit 71 for key-looking typing may store the fixed layout data 42d and the moving layout data 44d. The fixed layout data 42d and moving layout data 44d may be set in a layout that places importance on or prioritizes key-looking typing. The fixed layout data 42d and moving layout data 44d may facilitate key-looking typing for a user who performs typing while looking at the OSK 12. The fixed layout data 42d and the moving layout data 44d stored in the layout storage unit 71 for key-looking typing are collectively referred to as a layout for key-looking typing (key-looking typing layout).

In some embodiments, to perform the layout selection function, the CPU 20 may include a typing behavior determination unit 73 and a layout selection unit 74. The typing behavior determination unit 73 may determine a typing behavior of a user. In one embodiment, the typing behavior determination unit 73 may determine whether the user performs touch typing or not. Table 1 is one example of determination conditions for determining a typing behavior.

TABLE 1

| | Touch typing | Key-looking typing |
|---|---|---|
| Palm rest | Provided | Not provided |
| Finger rest | Provided | Not provided |
| Typing speed | Fast | Slow |
| Line of sight | Mainly to edit content | Mainly to OSK |

As shown in Table 1, in response to a palm rest, a finger rest, a fast typing speed (e.g. a speed higher than a predetermined speed), and the line of sight of the user mainly directed at an edit content, that the typing behavior determination unit 73 may determine that the user is performing touch typing. On the other hand, in response to the absence of a palm rest, the absences of a finger rest, a slow typing speed (e.g. a speed lower than a predetermined speed), and the line of sight of the user being mainly directed to the OSK 12, that the typing behavior determination unit 73 may determine that the user is performing key-looking typing.

In certain embodiments, the presences of a palm rest, a finger rest, and the typing speed may cause the typing behavior determination unit 73 to determine typing behavior based on a contact state. For example, the contact state may include a finger on the touch screen 11. A state of a palm resting may include a state of a palm placed on the touch screen 11 while operating a keyboard. A state of a finger resting may include a state of a finger placed on the touch screen 11 while operating the keyboard. The typing behavior determination unit 73 may determine the line of sight of a user based on directions of the face and the line of sight of the user obtained by capturing the face and eyes of the user with a camera 75 of the portable electronic device 10.

The determination conditions described above are an example. In some embodiments, some of the conditions, such as the presence of a palm rest and/or a finger rest, may not be used for the typing behavior determination. In some embodiments, other conditions may be used for the determination.

In certain embodiments, the layout selection unit 74 may select a layout from the flash memory 27. The layout selection unit 74 may select a layout based on, at least in part, a determination result by the typing behavior determination unit 73. In one embodiments, in response to determining that the user performs touch typing, the layout selection unit 74 may select a layout for touch typing. On the other hand, in response to determining that the user performs key-looking typing, the layout selection unit 74 may select a layout for key-looking typing. The layout selection unit 74 may output the selection result to the layout reader 60. In some embodiments, independently of the determination result by the typing behavior determination unit 73, the layout selection unit 74 may select the layout for touch typing or the layout for key-looking typing based on, at least in part, setting by the user. In one embodiments, the layout reader 60 may read the layout selected by the layout selection unit 74 from the flash memory 27 and output the layout to the output character code determination unit 62.

In one embodiment, to perform determination by the typing behavior determination unit 73, the user may perform typing to a degree sufficient to enable a typing behavior to be determined. In one embodiment, the typing behavior determination unit 73 may perform the determination. In one embodiment, until the typing behavior is determined, the layout for key-looking typing may be selected. In response to the typing behavior determination unit 73 determining that the user is performing touch typing, the layout selection unit 74 may change the layout for key-looking typing to the layout for touch typing.

The typing behavior determination unit 73 may continuously determine the typing behavior in response to the OSK 12 being displayed on the touch screen 11. In certain embodiments, in response to the user of the portable electronic device 10 changing to another user, a layout of the OSK 12 for the new user may be selected by the layout selection unit 74.

FIGS. 10A and 10B depict schematic diagrams that illustrate one embodiment of a touch typing layout 80. FIGS. 11A and 11B depict schematic diagrams that illustrate one embodiment of a key-looking typing layout 81. FIGS. 10A and 11A are schematic views in which the fixed sensing regions 48 may be distinguished from the moving sensing regions 50. FIGS. 10B and 11B are schematic views in which the fixed sensing regions 48 and the moving sensing regions 50 may not be distinguished from each other and are collectively represented as sensing regions 82.

The key-looking typing layout 81 may include a fixed sensing regions 48 larger than those of the touch typing layout 80. In one embodiment, the outer edges of the fixed sensing regions 48 may coincide with the outer edges 46A of the display key images 46 in the key-looking typing layout 81. The key-looking typing layout 81 may include a larger overlapping degree between the moving sensing region 50 and the fixed sensing region 48 for a display key than that of the touch typing layout 80. In some embodiments, the moving sensing region 50 for one display key may be set to cover the fixed sensing region 48 for the same display key. With this configuration, even if a user who performs key-looking typing types at a position shifted from the display key image 46 to some degree, is the typing behavior determination unit 73 may determine that the user types an intended display key. In one embodiment, the key-looking typing layout 81 may include the sensing region 82 usable for a user who performs key-looking typing.

In one embodiment, the touch typing layout 80 may include smaller fixed sensing regions 48 than those of the key-looking typing layout 81. In response, the moving sensing regions 50 for a user who performs touch typing may be easily set. The touch typing layout 80 may be used as the sensing region 82 usable for a user who performs touch typing.

As illustrated in FIGS. 10B and 11B, the sensing regions 82 of the touch typing layout 80 may be irregular. In one embodiment, an irregular sensing region 82 may tend to vary among users as compared to the sensing regions 82 of the key-looking typing layout 81.

In some embodiments, the present disclosure has been described with reference to the embodiments. The technical scope of the present disclosure, however, is not limited to the range described in the above embodiments. Various changes and modifications may be made on the embodiments within the range of the subject matter of the invention, and embodiments obtained by such changes and modifications are included in the technical scope of the disclosure. The embodiments may be suitably combined.

For example, in the above embodiments, the software keyboard may include the OSK 12 displayed on the touch screen 11 of the portable electronic device 10. The present disclosure, however, is not limited to this example. As illustrated in FIG. 12, the software keyboard may include a flat keyboard 90 that is a flat-plane keyboard externally connected to the portable electronic device 10 through the connection port 13. The flat keyboard 90 may include a touch screen and may display a software keyboard. The software keyboard, according to one of the above embodiments, may include an optical keyboard that is projected on an object such as a table, a paper medium, or a human body or space to receive a key input from a user.

Additionally, embodiments may take the form of a program product embodied in one or more computer readable storage mediums storing machine-readable code, computer readable code, executable code, and/or program code, referred hereafter as code. The storage devices may include tangible, non-transitory, and/or non-transmission storage devices. The storage devices may not embody mere signals. In certain embodiments, the storage devices may employ signals for accessing code.

A person of ordinary skill in the art may be aware that, the units (for example, output character code determination unit 62, the typing behavior determination unit 73, or the like) and algorithm steps of the examples described in combination with the embodiments disclosed herein may be implemented in the form of electronic hardware, computer software, or a combination of the both. Moreover, a software module, unit, or the like may be placed in a computer storage medium in various forms. To describe interchangeability of hardware and software, the formation and steps of various examples have been described herein in general according to their functions. With respect to whether the functions are performed by hardware or software, it may depend on particular applications and design constraints of the technical solutions. For each particular application, a person skilled in the art may implement the described functions by using different methods. In one embodiment, the units, modules, or the like may include a hardware implementation. A hardware implementation may include a special processor, chip, circuitry, or the like.

The flow of the processes described in the above embodiments is an example. Certain steps may be eliminated, new steps may be added, and/or steps may be performed in different orders within the subject matter of the disclosure.

What is claimed is:

1. An electronic device comprising:
a touch screen;
a software keyboard for the touch screen comprising a plurality of keys, each key comprising a sensing region and a character code, wherein the software keyboard detects a contact on a sensing region of a key and outputs the character code of the key;
a memory that stores a first layout configured to facilitate typing without looking at the software keyboard based on a memorized relative layout of the keys ("touch typing") and a second layout configured to facilitate typing while looking at the software keyboard ("key-looking typing"), the first layout and the second layout each comprising a fixed layout and a moving layout, wherein
the fixed layout comprises a plurality of fixed sensing regions, each fixed sensing region corresponding to a key of the plurality of keys and comprising an unchangeable range, and
the moving layout comprises a plurality of moving sensing regions, each moving sensing region corresponding to a key of the plurality of keys and comprising a changeable range; and a character code output unit that, in response to the contact contacting at least one of
  one of the plurality of fixed sensing regions, and
  one of the plurality of moving sensing regions,
  outputs the character code corresponding to the key of the contacted sensing region.

2. The electronic device of claim 1, further comprising a layout change unit that changes the moving sensing regions based on, at least in part, a contact position of a user on the key.

3. The electronic device of claim 2, wherein the layout change unit changes each of the plurality of moving sensing regions corresponding to at least one key within a range in which the moving sensing region does not overlap a corresponding one of the plurality of fixed sensing regions for an adjacent other key.

4. The electronic device of claim 1, wherein each of the fixed sensing regions corresponds to a range in which the fixed sensing region does not extend across an outer edge of an image representing a corresponding key.

5. The electronic device of claim 1, further comprising:
  a determination unit that determines whether a user performs touch typing;
  a selection unit that selects at least one of the first layout and the second layout based on, at least in part, a determination result of the determination unit.

6. The electronic device of claim 5, wherein the fixed sensing regions of the second layout are larger than the fixed sensing regions of the first layout.

7. The electronic device of claim 5, wherein the determination unit determines whether the user performs touch typing based on the user exhibiting one or more typing behaviors selected from the group consisting of resting a palm on the touch screen ("palm rest"), resting a finger on the touch screen ("finger rest"), a typing speed that is higher than a predetermined speed, directing a line of sight toward content being edited, and combinations thereof.

8. A method comprising:
  determining a position of a contact on a software keyboard, wherein the software keyboard comprises
    a plurality of keys, each key comprising a sensing region and a character code,
    a fixed layout comprising a plurality of fixed sensing regions, each fixed sensing region corresponding to a key of the plurality of keys and comprising an unchangeable range, and
    a moving layout comprising a plurality of moving sensing regions, each moving sensing region corresponding to a key of the plurality of keys and comprising a changeable range; and
  determining whether the position of the contact corresponds to at least one of the fixed sensing region and the moving sensing region of a key of the plurality of keys;
  outputting the character code of the key in response to the position of the contact being within at least one of the fixed sensing region and the moving sensing region of the key, and
  outputting the character code of the closest key of the plurality of key to the position of the contact, in response to the position of the contact being in a gap between keys and outside of the sensing regions.

9. The method of claim 8, further comprising, in response to the position of the contact corresponding to the moving sensing region of the key, moving the moving sensing region based on, at least in part, the position of the contact.

10. The method claim 9, wherein moving the moving sensing region comprises moving each of the plurality of moving sensing regions corresponding to at least one key within a range in which the moving sensing region does not overlap a corresponding one of the plurality of fixed sensing regions for an adjacent other key.

11. The method of claim 8, further comprising:
  selecting the fixed layout and the moving layout of a first layout configured to facilitate typing without looking at the software keyboard based on a memorized relative layout of the keys ("touch typing"); and
  selecting the fixed layout and the moving layout of a second layout configured to facilitate typing while looking at the software keyboard ("key-looking typing").

12. The method of claim 11, further comprising:
  determining whether a user performs touch typing; and
  selecting at least one of the first layout and the second layout based on the determination of whether the user performs touch typing.

13. The method of claim 12, wherein the selecting at least one of the first layout and the second layout comprises providing the fixed sensing regions of the second layout that are larger than the fixed sensing regions of the first layout.

14. The method of claim 12, wherein the selecting the at least one of the first layout and the second layout comprises providing a degree of overlapping between one of the moving sensing regions and one of the fixed sensing regions corresponding to a display key of the second layout and wherein the degree is larger than the degree of the first layout.

15. A program product comprising a non-transitory computer readable storage medium that stores code executable by a processor, the executable code comprising code to perform:
  determining a position of a contact on a software keyboard, wherein the software keyboard comprises
    a plurality of keys, each key comprising a sensing region and a character code,
    a fixed layout comprising a plurality of fixed sensing regions, each fixed sensing region corresponding to a key of the plurality of keys and comprising an unchangeable range, and
    a moving layout comprising a plurality of moving sensing regions, each moving sensing region corresponding to a key and comprising a changeable range;
  determining whether the position of the contact corresponds to at least one of the fixed sensing region and the moving sensing region of a key of the plurality of keys;
  learning a typing habit of a user and adjusting the changeable range of the moving sensing regions in response to the typing habit of the user; and
  in response to the position of the contact corresponding to at least one of the fixed sensing region and the moving sensing region of the key, outputting the character code of the key.

16. The program product of claim 15, wherein the executable code further comprises code to perform, in response to the position of the contact corresponding to the moving sensing region of the key, moving the moving sensing region based on, at least in part, the position of the contact.

17. The program product of claim 16, wherein the code to perform moving the sensing region comprises code to perform moving each of the plurality of moving sensing regions corresponding to at least one key within a range in which the moving sensing region does not overlap a corresponding one of the plurality of fixed sensing regions for an adjacent other key.

18. The program product of claim 15, wherein the executable code further comprises code to perform:
   selecting the fixed layout and the moving layout of a first layout configured to facilitate typing without looking at the software keyboard based on a memorized relative layout of the keys ("touch typing"); and
   selecting the fixed layout and the moving layout of a second layout configured to facilitate typing while looking at the software keyboard ("key-looking typing").

19. The program product of claim 18, wherein the executable code further comprises code to perform:
   determining whether a user performs touch typing; and
   selecting at least one of the first layout and the second layout based on the determination of whether the user performs touch typing.

20. The program product of claim 19, wherein the code to perform selecting at least one of the first layout and the second layout comprises code to perform at least one of:
   providing the fixed sensing regions of the second layout that are larger than the fixed sensing regions of the first layout; and
   providing a degree of overlapping between one of the moving sensing regions and one of the fixed sensing regions corresponding to a display key of the second layout, wherein the degree is larger than the degree of the first layout.

* * * * *